United States Patent [19]

Whitehead

[11] 4,117,788
[45] Oct. 3, 1978

[54] SEED DRILL INCLUDING DISCS DRIVEN BY GROUND WHEEL DRIVE

[76] Inventor: Edward Whitehead, Little Hill Farm, Dodwell, Stratford-upon-Avon, Warwickshire, England

[21] Appl. No.: 785,183

[22] Filed: Apr. 6, 1977

[30] Foreign Application Priority Data

Apr. 7, 1976 [GB] United Kingdom ............... 14088/76

[51] Int. Cl.² ........................... A01C 5/06; A01C 7/00
[52] U.S. Cl. .................................... 111/52; 111/59; 111/62; 111/78; 111/87; 172/55; 172/106; 221/266; 222/613
[58] Field of Search ................... 172/55, 106, 594–597, 172/105; 221/185, 266; 222/613, 614, 623; 111/1, 14, 34, 36, 52, 59, 60, 63, 66, 72, 74, 77, 78, 84, 85, 86, 87, 88, 79, 70, 81, 61, 62, 64, 65

[56] References Cited

U.S. PATENT DOCUMENTS

| 280,059 | 6/1883 | Mekenney | 111/74 |
|---|---|---|---|
| 460,366 | 9/1891 | Snell | 111/70 |
| 540,758 | 6/1895 | Pelton | 111/86 X |
| 591,312 | 10/1897 | Wauthier | 111/82 |
| 1,269,028 | 6/1918 | White | 172/106 |
| 1,281,325 | 10/1918 | Fetzer | 111/66 X |
| 1,539,066 | 5/1925 | Adamy | 172/106 X |
| 1,971,278 | 8/1934 | Schurmann | 111/86 X |
| 2,042,133 | 5/1936 | Underwood | 111/52 |
| 2,199,755 | 5/1940 | Pyron | 111/1 |
| 2,449,062 | 9/1948 | Dewey | 111/59 X |
| 2,455,147 | 11/1948 | Traver | 111/59 UX |
| 2,496,885 | 2/1950 | Milton | 111/85 |
| 2,727,450 | 12/1955 | Hershner | 172/55 |
| 3,031,984 | 5/1962 | Esmay | 111/82 |

FOREIGN PATENT DOCUMENTS

| 1,370,578 | 12/1964 | France | 111/74 |
|---|---|---|---|
| 1,302,011 | 12/1962 | France | 111/78 |
| 937,979 | 12/1955 | Fed. Rep. of Germany | 111/87 |
| 19,701 | 9/1915 | United Kingdom | 111/52 |
| 1,048,616 | 11/1966 | United Kingdom | 111/78 |
| 302,064 | 4/1971 | U.S.S.R. | 111/77 |

Primary Examiner—Edgar S. Burr
Assistant Examiner—Steven A. Bratlie
Attorney, Agent, or Firm—Spencer & Kaye

[57] ABSTRACT

Seed sowing apparatus comprising a plurality of ground-engaging discs arranged in staggered relationship in two or more rows and driven from ground-engaging wheels, with individual seed metering devices carried by and driven by each disc to deposit seeds at regularly spaced intervals.

16 Claims, 4 Drawing Figures

FIG 1

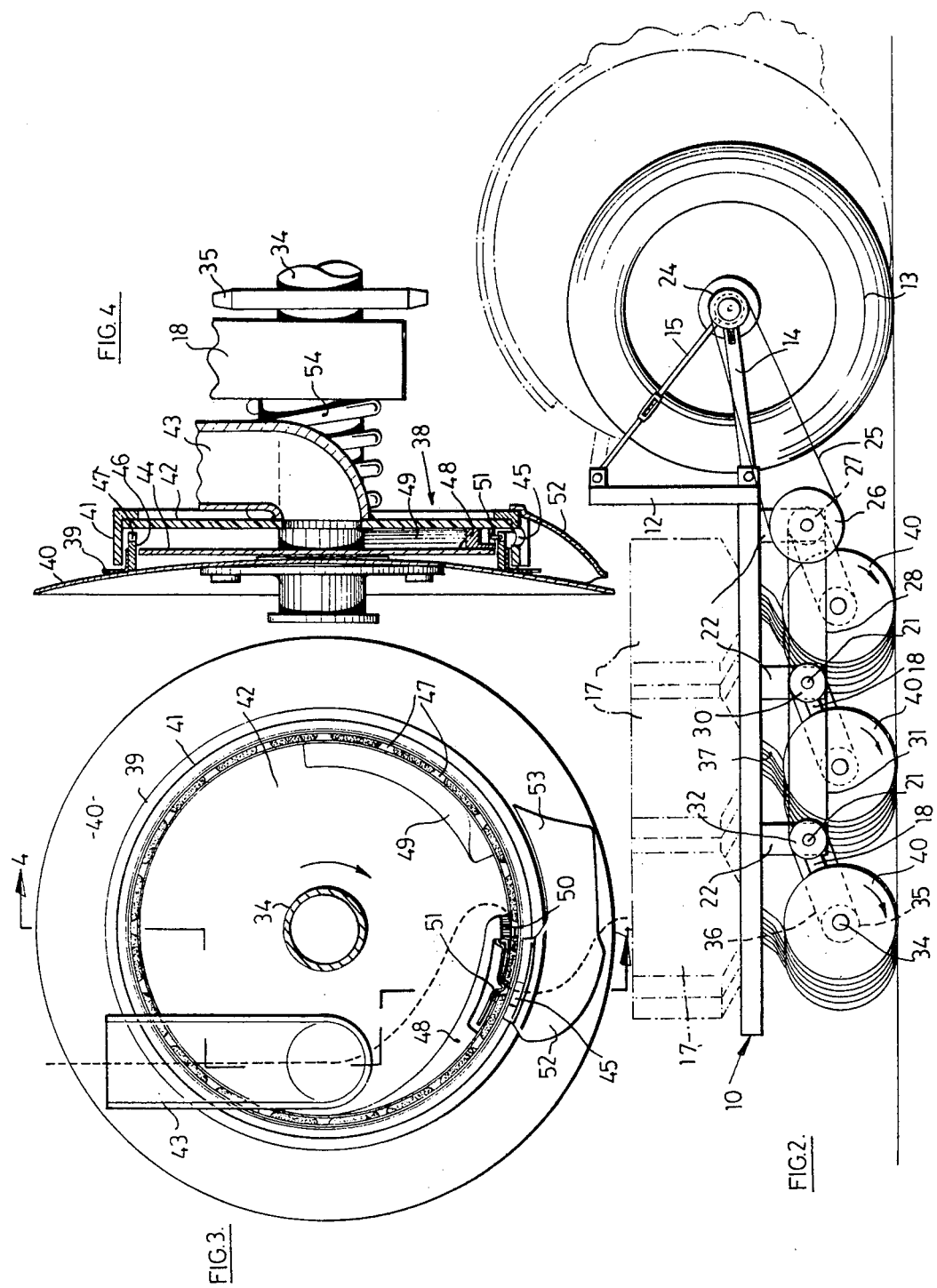

SEED DRILL INCLUDING DISCS DRIVEN BY GROUND WHEEL DRIVE

This invention relates to seed drills. Various types of drill are known for sowing seeds such as grain in a number of parallel rows with some form of regulation of the rate at which seeds are deposited in each row. However, in practice, the spacing between adjacent rows cannot normally be reduced to less than about eight inches where the supply of seeds is metered at a position remote from the sowing position, as is commonly the case, such an arrangement providing only a crude control over the rate of sowing by imposing a restriction on the rate of delivery of seeds under gravity feed. Drills are also known with more accurate control over the feed rate, and such drills have individual metering or dispensing devices in the immediate vicinity of the points at which the seeds are deposited. This enables the spacing of the seeds in each row to be more accurately controlled, but the metering and dispensing arrangements are relatively complicated and bulky with the result that it is difficult and expensive to construct such a drill to sow rows closer together than about 18 inches.

In order to achieve the optimum results, it is desirable that seeds should be spaced apart substantially equally in both directions, i.e. along the row and between the rows, so that each seed has an individual area of soil in which to germinate and grow. With present seed drills, whilst on average each seed may have the optimum growth area, in practice, the seeds are then too close together along each row and further apart than necessary between adjacent rows so that the optimum conditions are not attained for each individual seed.

It is an object of the present invention to provide a seed drill of simple and economical design which enables seeds to be sown in rows arranged substantially closer than previously possible whilst at the same time being spaced apart in each row at substantially regular, predetermined intervals.

According to the present invention I provide a seed drill comprising:
(a) a plurality of rotatable ground-engaging discs arranged in two or more rows extendings transversely of the direction of intended travel of the drill with the discs in each row laterally offset relative to those of the or each other row so that the discs in combination form a plurality of parallel grooves in the soil when the drill is in use,
(b) at least one ground-engaging wheel adapted to be driven by ground engagement as the drill is advanced,
(c) transmission means drivingly connecting said discs to said ground-engaging wheel so as to rotate said discs at a rate related to the ground speed of the drill, and
(d) associated with each such disc a respective seed metering device comprising:
(i) a hub member secured to the disc so as to rotate therewith,
(ii) a sleeve member encompassing the periphery of said hub member and held against rotation therewith, and
(iii) a seed receptacle affording an outlet effectively closed by said hub member, the hub member being formed or provided with a plurality of seed receiving pockets disposed at spaced intervals around its circumference so as to accept seeds from said outlet of the receptacle and convey same circumferentially to a discharge opening formed in the sleeve member at or near its lowest point adjacent to said disc.

The invention effectively integrates the groove forming component of the drill with a precision seed dispensing means of simple form, thereby enabling the transverse width of the disc and seed dispensing device to be minimised. By arranging the discs in two or more rows, the transverse spacings between individual discs in each row may be a multiple of the desired spacing between each row of seeds, and this simplifies the construction and maintenance of the drill.

It is preferred for the discs to be of somewhat concave form and arranged for rotation about transverse axes which extend non-perpendicularly relative to the direction of travel so that in this respect the drill acts substantially in the manner of a disc harrow. In this case, the seed metering devices are preferably disposed at the convex sides of the associated discs.

The ground-engaging wheel or wheels may be vertically adjustable in position so as to vary the depth of penetration of the discs into the soil. Preferably, the transmission means whereby the discs are driven from the ground-engaging wheels comprises a series of chains or the like running over sprocket wheels so that the discs are positively driven without the possibility of slip occurring. Alternatively, a system of meshing gears and transmission shafts could be employed.

The transmission system desirably is arranged to drive the discs at a rate of rotation such that the discs do not have rolling engagement with the ground, but cut through the soil. This is most conveniently achieved by arranging the transmission means to afford a step down transmission whereby the discs are rotated angularly at a slower rate than the ground-engaging wheels whereby they are driven.

The seed receptacle may be disposed within the hub member so as to be closed at its lower end by the latter, the pockets in the latter preferably being formed by spaced recesses in the edge of the hub member presented away from the disc.

The receptacle may include a guide member to deflect seed therein towards said pockets and means, such as a brush, to close each pocket in turn and sweep excess seeds clear of the pockets as the hub rotates. Preferably, ejector means, such as a light spring or a further brush, are provided adjacent to said discharge opening in the sleeve positively to eject seeds from each pocket in turn as it passes said opening. A deflector plate may be provided adjacent to said opening to deflect the seeds forwardly and towards the associated disc.

Conveniently, the hub member includes a removable liner in which the pockets are formed so that different liners with various sizes of pocket and various pocket spacings may be interchanged to suit different seeds.

The receptacle may be open to the pockets additionally at a further position adjacent to the discharge opening in a sleeve so as to admit seeds to the pocket immediately after they have passed the discharge opening. In this case, the receptacle would additionally afford a shield within the hub to retain such seeds within the pockets as the latter revolve over the receptacle to the guide member at which further seeds are admitted to any empty pockets.

Each disc may be rotatably mounted on a pivoted arm so as to be capable of following indulations in the ground, and each disc may have associated therewith one or more scrapers to remove soil clinging thereto which might otherwise disturb the placing of the seeds.

The apparatus may include a ground-engaging roller or other means disposed rearwardly of the discs for the purpose of covering over the deposited seeds. Preferably, seeds are supplied to the receptacles through tubes leading from one or more storage hoppers carried above the discs. Conveniently, there may be a single hopper associated with each disc, or with a pair of such discs.

The invention will now be described by way of example with reference to one embodiment of seed planting apparatus as shown in the accompanying drawings wherein;

FIG. 2 is a somewhat simplified side view corresponding to FIG. 1;

FIG. 3 is a side elevational view partly in section showing a disc and said metering device; and FIG. 4 is a vertical section on the line 4—4 of FIG. 3.

Figure 1:
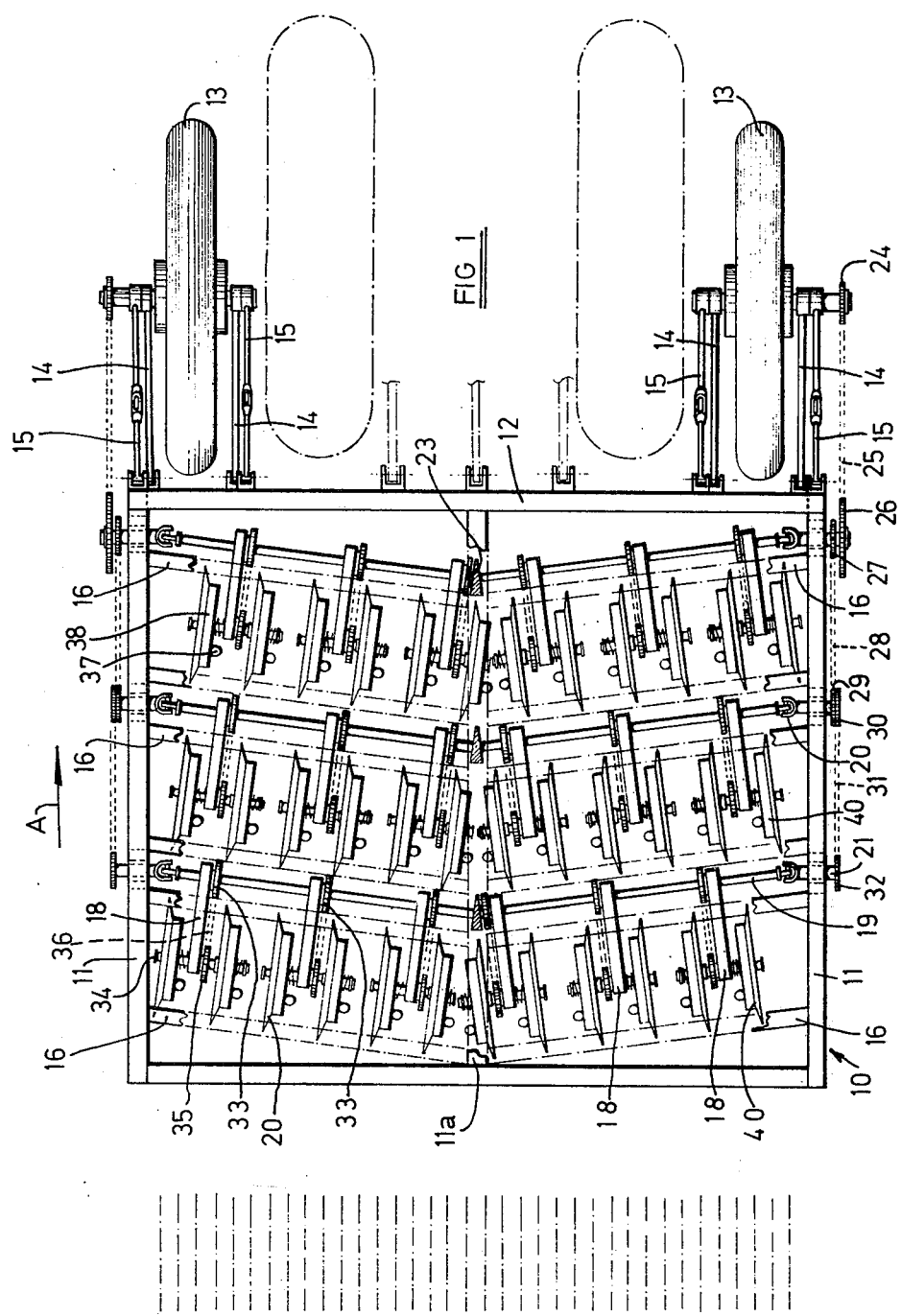
FIG. 1 is a plan view thereof omitting certain parts for clarity.

Referring firstly to FIGS. 1 and 2 of the accompanying drawings, there is shown therein an apparatus comprising a main frame 10 including longitudinal members 11 and at its forward end an upright sub-frame 12 equipped with mounting points for use with the usual three-point linkage of a towing tractor. At each end, the sub-frame 12 carries a pair of ground wheels 13 each rotatably supported by a pair of forwardly extending arms 14 which are pivotally mounted on the sub-frame. Adjustable length struts 15 extend between the upper part of the sub-frame 12 and the forward ends of the arms 14 so that the height of the frame 10 relative to the axis of rotation of the wheels 13 may be adjusted.

The frame further comprises transverse members 16 which extend between the outermost longitudinal members 11 and a central longitudinal member 11a. As can be seen, the transverse members do not extend perpendicularly transverse to the direction of travel (as indicated by the arrow A) but are inclined to such a perpendicular by a small angle, typically in the range from 5° to 10°, and preferably 7½°. The transverse members 16 carry a plurality of seed hoppers 17 arranged in rows, there being preferably three such hoppers 17 on each side of the centre line in each row.

The frame 10 supports at its underside three rows of discs 40 arranged in pairs which are supported by respective trailing arms 18 carried by transverse shafts 19 which extend parallel to the transverse members 16. At their outermost ends the shafts 19 are connected by means of a universal joint 20 to a rotatable stub axle 21 supported by downwardly extending brackets 22. At their innermost ends, the shafts 19 may be similarly supported beneath the central longitudinal member 11a, or, as shown, they may be supported by bearings carried by similar downwardly extending brackets 23.

The arms 18 are freely pivoted on the shafts 19 so as to be free to move up and down in response to local undulations in the level of the ground as the discs 40 carried thereby are advanced over the ground and springs (not shown) may be provided to act between said arms and a part of the frame to bias the arms positively downwardly. Suitable collars (not shown in FIG. 1) are secured to the shafts 19 to hold the arms 18 at the desired positions along the length of the shafts.

Each stub axle 21 is rotatably driven from one of the ground wheels 13 and for this purpose a sprocket 24 is provided on each wheel axle and this is connected by means of a chain or notched belt 25 to a first sprocket 26 carried by the leading stub axle. The sprockets 24 and 26 are designed to afford a step-down gearing ratio, and preferably one or other of such sprockets may be exchangeable for sprockets of different sizes so as to enable the step-down ratio to be varied. In this case, suitable chain tensioning means (not shown) would be provided. The first stub axle also carries a second sprocket 27 engaged by a chain or notched belt 28 which in turn engages one of a pair of sprockets 29, 30 carried by the next stub axle. The other of such pair of sprockets carries a further chain or notched belt 31 to drive a single sprocket 32 carried by the rearmost stub axle 21. The sprockets 27, 29, 30 and 32 are all of the same size so that the shafts 19 are all driven at the same angular rate, which is related to, but slower than, the rate of rotation of the ground-engaging wheels 13.

Each shaft 19 carries a respective sprocket 33 adjacent to each arm 18 to transmit drive from the shaft to a shaft 34 rotatably supported at the rearward end of each arm 18. Each such shaft 34 carries a similar sprocket 35 and a chain or notched belt 36 extends around the sprockets 33 and 35. The discs 40 are mounted in pairs on each axle 34 on respective sides of the arm 18 whereby each axle is supported, and each disc is rigidly secured to the axle so as to rotate therewith.

As can be seen in FIG. 1, the discs 40 in each row are laterally offset relative to the discs in the other rows so that whilst the discs in each row may be spaced apart by approximately 6 inches, the lateral spacing between the discs collectively can readily be made as little as 2 inches.

Seed is conveyed from the hoppers 17 through tubes 37 to individual seed metering devices 38 associated with, and driven by, each individual disc 40.

Referring now in more detail to the seed metering devices 38 associated with each disc 40, as can best be seen in FIGS. 3 and 4 of the accompanying drawings, each such device includes an annular hub member 39 which is fixedly secured to the disc at its convex side concentric with the axle 34. The hub 39 rotates within a stationary outer sleeve 41 which is also of annular form but carries a closure plate 42 to which is connected an inlet tube 43 for connection to the tube 37 from the hopper 17. A further plate 44 is carried within the hub 39 in spaced relation from the plate 42 and the two plates in combination define a seed receptacle from which seed may be dispensed through a discharge opening 45 in the sleeve 41 at a position near the lowest point thereof. The assembly of plates 42 and 44 may be held against rotation by means of a suitable bracket (not shown) extending from the adjacent arm 18.

In order to meter the flow of seed from the interior of the receptacle to the discharge opening 45, the hub 39 carries a replaceable liner 46 which fits securely therein. The peripheral edge of the liner 46 furthest from the associated disc 40 is formed with a plurality of pockets defined by circumferentially spaced recesses or notches 47 which, as the hub 39 and liner 46 in combination are rotated by the disc 40 are each successively brought into register with the discharge opening 45 in the sleeve 41. Although a single row of pockets is shown, it would be possible to provide a further, laterally spaced row of pockets defined by through-holes in circumferentially staggered relation with the recesses 47. However, a cover member 48 is secured between the plates 42 and 44 and extends from a position just prior to the discharge opening 45 to a position substantially level with the axle 34 so as to prevent direct flow of seeds through the recesses 47 and the opening 45.

A shaped guide member 49 is carried by the plate 44 so that seeds within the receptacle are directed away from the plate 44 towards the edge of the liner 46 in which the recesses 47 are formed. The guide member extends from a position substantially level with the axle 34 almost to the lowest point of the sleeve.

Thus, the recesses 47 are exposed to the interior of the receptacle as they pass between guide member 49 and the cover member 48 and seeds from the receptacle may enter such recesses, which are so dimensioned as to accommodate a single seed of a predetermined size. It will be appreciated that to allow the apparatus to be used with different types of seed, a plurality of interchangeable liners 46 may be provided, having recesses of differing sizes, shapes, and peripheral spacings.

The cover member 48 carries at its lowest point a small brush 50 which serves both to deflect surplus seeds away from the recesses and also to press seeds already in the recesses outwardly towards the sleeve 41. Within the cover member 48 there is also provided a spring 51 which acts upon the seeds in each recess 47 as they pass the discharge opening 45 so as positively to ensure that the seeds are ejected. In this way, individual seeds are ejected at regularly spaced intervals determined by the rate of rotation of the discs 40 relative to the rotation of the ground wheels 13, and in a typical embodiment it is readily possible to achieve a spacing of 2 inches along each row, with spacings of 2 inches between adjacent rows so that seeds are distributed at 2 inch intervals both longitudinally and transversely.

A deflector plate 52 is carried by the sleeve 41 to deflect the seeds as they are discharged through the openings 45 inwardly towards the adjacent disc 40 and forwardly relative to the direction of travel so as to minimise the possibility of the seeds bouncing on impact with the soil. Conveniently, the plate 52 carries a forward extension 53 which is bent towards the convex surface of the disc so as to act as a scraper to remove any soil clinging to the side of the disc, which might otherwise accumulate on the deflector plate and hinder its proper working. A further scraper (not shown) may be arranged to scrape the concave side of the disc and this scraper may be carried by the bracket which holds the plates 42 and 44 against rotation.

Conveniently, the plate 42 is made of a suitable transparent plastics material so that the contents of the seed receptacle can be inspected. For the purpose of removing the liners 46, the assembly of sleeve 41, plates 42 and 44 is retained in assembled relation with the hub member 39 and liner 46 by means of a spring 54, so that the seed receptacle may be displaced along the axle 34 to allow the liner 46 to be removed.

Preferably, as previously mentioned, the frame 10 includes means (not shown) for securing a trailing roller, or other device to cover over the deposited seeds. Alternatively, or additionally a soil deflector blade may be provided for this purpose adjacent to each disc, supported for example by the brackets which carry the scrapers acting on the concave side of the discs.

To safeguard against continued operation of the apparatus if one of the seed metering devices becomes blocked, or if one of the hoppers is empty, it would be possible to secure a minature detector adjacent to each discharge outlet 45 so as to register each seed discharged. For example, a photo-electric cell could be employed for this purpose and arranged to energise a warning light on a control panel so as to give a visual indication of whether or not seeds are being discharged.

Although the invention has been described in relation to the deposition of seeds, it will be appreciated that the apparatus may be utilised with any granular material, including pelletised seeds and pelletised fertiliser or other material.

In a modified embodiment (not illustrated) the cover member 48 could terminate at a position nearer the discharge opening 45, and the guide member 49 could be extended completely over the receptacle to a point near to the shorter cover member to form a shield. The gap between the shorter cover member and extended guide member would afford a secondary access to the recesses 47 so that some of these recesses at least would pick up seeds during their upward movement and be carried over the top of the receptacle between the extended guide member and the sleeve 41. When the recesses 47 emerge from beneath the guide member 49, only those not already containing seeds, would then take up seeds at that position.

I claim:

1. Seed sowing apparatus comprising:
   (a) a plurality of rotatable ground-engaging discs arranged in two or more rows extending transversely of the direction of intended travel of the apparatus with the discs in each row laterally offset relative to those of the or each other row so that the discs in combination form a plurality of parallel grooves in the soil when the apparatus is in use;
   (b) at least one ground-engaging wheel mounted to be driven by ground engagement as the apparatus is advanced;
   (c) transmission means drivingly connecting said discs to said ground-engaging wheel so as to rotate said discs at a rate related to the ground speed of the apparatus; and
   (d) associated with each such disc a respective seed metering device comprising:
      (i) a hub member secured to the disc so as to rotate therewith;
      (ii) a sleeve member encompassing the periphery of said hub member and held against rotation therewith; and
      (iii) a seed receptacle affording an outlet effectively closed by said hub member, the hub member being formed or provided with a plurality of seed receiving pockets disposed at spaced intervals around its circumference so as to accept seeds from said outlet of the receptacle and convey same circumferentially to a discharge opening formed in the sleeve member or near its lowest point adjacent to said disc.

2. Apparatus according to claim 1 wherein the seed receptacle of each seed metering device is disposed within the hub member of the associated disc so as to be closed at its lower end by such hub member.

3. Apparatus according to claim 2 wherein the pockets in the hub member are formed by spaced recesses in the edge of the hub member furthest away from the associated disc.

4. Apparatus according to claim 2 wherein the receptacle includes a guide member to deflect seed therein towards said pockets and means to close each pocket in turn and sweep excess seeds clear of the pocket as the hub rotates.

5. Apparatus according to claim 2 wherein ejector means are provided adjacent to said discharge opening in the sleeve positively to eject seeds from each pocket in turn as it passes said opening.

6. Apparatus according to claim 2 wherein a deflector plate is provided adjacent to said discharge opening to deflect the seeds forwardly and towards the associated disc.

7. Apparatus according to claim 2 wherein the hub member includes a removable liner in which the pockets are formed and different, interchangeable liners with various sizes of pocket and various pocket spacings are provided.

8. Apparatus according to claim 1 wherein each disc is rotatably mounted on a pivoted arm so as to be capable of following indulations in the ground.

9. Apparatus according to claim 1 including one or more seed storage hoppers carried above the discs, with tubes leading from such hopper or hoppers to the seed receptacles in the seed metering devices.

10. Apparatus according to claim 1 wherein the transverse axes about which the discs rotate are inclined at an angle of between 5° and 10° to a line perpendicularly transverse to the direction of travel.

11. Apparatus according to claim 10 wherein the axes of rotation of discs disposed on opposite sides of the longitudinal center line of the apparatus are arranged at angles of identical magnitude to the direction of travel.

12. Apparatus according to claim 1 wherein the, or each ground-engaging wheel is vertically adjustable in position so as to vary the depth of penetration of the discs into the soil.

13. Apparatus according to claim 1 wherein the transmission means affords a step-down transmission whereby the discs are rotated angularly at a slower rate than the ground-engaging wheels from which they are driven.

14. Apparatus according to claim 13 wherein the transmission means affords a variable step-down ratio.

15. Apparatus according to claim 1 wherein said transmission means are constructed for rotating each said disc at an angular rate different from that of said wheel, whereby each said disc effects a nonrolling engagement with the ground during travel of said apparatus.

16. Apparatus as defined in claim 15 for sowing seeds of a selected size, wherein each of said seed receiving pockets is dimensioned to have a capacity to receive only one such seed at a time.

* * * * *